United States Patent [19]

Buchfink

[11] Patent Number: 5,415,512
[45] Date of Patent: May 16, 1995

[54] DEVICE FOR LOADING BULK MATERIAL

[75] Inventor: Adolf Buchfink, Rosengarten-Klecken, Germany

[73] Assignee: Claudius Peters Aktiengesellschaft, Buxtehude, Germany

[21] Appl. No.: 43,669

[22] Filed: Apr. 6, 1993

[30] Foreign Application Priority Data

Apr. 8, 1992 [DE] Germany .................. 42 11 855.7

[51] Int. Cl.6 ............................................ B65G 11/12
[52] U.S. Cl. .................................. 414/299; 414/291; 414/328
[58] Field of Search ........ 414/179, 291, 292, 299–302, 414/328, 397

[56] References Cited

U.S. PATENT DOCUMENTS

| 3,262,586 | 7/1966 | Smiley et al. | 414/301 |
| 3,349,930 | 10/1967 | Welborn | 414/301 X |
| 4,053,068 | 10/1977 | Gidick | 414/397 X |
| 4,065,005 | 12/1977 | Mable et al. | 414/397 |
| 4,302,110 | 11/1981 | Neimi | 414/299 X |
| 4,619,576 | 10/1986 | George et al. | 414/300 |
| 4,941,792 | 7/1990 | Cimenti et al. | 414/299 X |

FOREIGN PATENT DOCUMENTS

| 0141052 | 5/1985 | European Pat. Off. | |
| 2338208 | 8/1977 | France | |
| 0017738 | 3/1956 | Germany | 414/179 |
| 2821211 | 11/1979 | Germany | |
| 1207957 | 1/1986 | U.S.S.R. | 414/300 |
| 1261872 | 10/1986 | U.S.S.R. | 414/291 |
| 1370039 | 1/1988 | U.S.S.R. | 414/291 |
| 1539153 | 1/1990 | U.S.S.R. | 414/291 |

Primary Examiner—Michael S. Huppert
Assistant Examiner—James W. Keenan
Attorney, Agent, or Firm—Chilton, Alix & Van Kirk

[57] ABSTRACT

A device for loading bulk material from a stationary source to a filler pipe located at a chosen spot within a predetermined line of travel. The device comprises a loading hopper which is shiftable along the line of travel and exhibits, at its lower end, a filling mechanism and a conveying pipe, feeding the bulk material to the loading hopper, which conveying pipe is pivotably mounted at its end receiving the material and the outlet end of which opens out into the loading hopper. The loading hopper is closed off at the top by a cover, which exhibits an opening receiving the outlet end of the conveying pipe. The cover is rotatable in relation to the loading hopper, the opening being eccentrically disposed. Expediently, the rim of the loading hopper and the cover are circular.

9 Claims, 3 Drawing Sheets

DEVICE FOR LOADING BULK MATERIAL

Since it is difficult to maneuver a transport vehicle for loading with bulk material such that its filler pipe is located precisely below the filling mechanism, the filling mechanism is constructed so as to be horizontally movable to enable it to be adjusted to the different position of the filler pipe. This means that a movable connection between the filling mechanism and the stationary source—for example a silo outlet—has to be provided in the loading device. For this purpose, shiftable loading hoppers have become established which, at the lower, narrow end, support the filling mechanism and whose upper opening, to which the material is fed from the stationary source, has a width corresponding to the line of travel.

Where a silo outlet is disposed directly above the loading hopper (DE-B-1219392), the hopper has, in its direction of travel, a length which is at least equal to its maximum line of travel. In the extreme positions, said hopper extends from the silo outlet over this entire length, although its range of conveyance amounts to only half the length. The spatial requirement is therefore high in relation to the operating range.

A lower spatial requirement in the direction of travel of the hopper is achieved in the case of another known device (overt prior public use). Here the material is fed to the loading hopper, by means of a conveying pipe, from a source situated to the side of the path of travel of the loading hopper. To enable that end of the conveying pipe which opens out at the loading hopper to track the movement of the loading hopper, its other end is pivotably mounted. Upon the movement of the loading hopper, the hopper-side end of the pipe describes a circular movement and moves in relation to the loading hopper transversely to its direction of travel. The principal extent of said loading hopper therefore lies transversely to the direction of travel. As protection against the escape of dust, it is covered by a displaceable plate exhibiting an opening for the conveying pipe to be passed through. In the respective end positions of the hopper, this plate protrudes laterally beyond the hopper to the one side, in the central position of the hopper to the other side. Due to the high lateral spatial requirement which is thereby created, the parallel arrangement of a plurality of such loading devices at a small distance apart is not possible.

The object of the present invention is to provide a device for loading bulk material from a stationary source to a filler pipe located at a chosen spot within a predetermined line of travel, which does not exhibit or only to a lesser extent exhibits said disadvantages, which, in particular, requires less space, is inexpensive to manufacture and offers prospects for the adoption of effective dedusting measures.

The invention achieves this object by the fact that the cover is rotatable in relation to the loading hopper and the opening receiving the outlet end of the conveying pipe is disposed eccentrically in the cover.

The invention in a preferred form is a device for loading bulk material. The device comprises a conveying pipe having a receiving end for receiving the bulk material from a stationary source, and an outlet end which is movable along an arcuate path relative to the receiving end. The device also includes a loading hopper for receiving the bulk material from the outlet end of the conveying pipe. The loading pipe is movable along a predetermined line of travel. A rotatable cover is disposed on the loading hopper. The cover has an eccentrically disposed opening which is connected to the outlet end of the conveying pipe.

Another preferred form of the invention is a device for loading bulk material from a stationary source to a filler pipe located at a chosen spot within a predetermined line of travel. The device has a loading hopper which is shiftable along the line of travel and exhibits, at its lower end, a filling mechanism. The device further includes a conveying pipe for feeding the bulk material to the loading hopper. The conveying pipe is pivotally mounted at the end which receives the material from the stationary source. The outlet end of the conveying pipe opens out at the loading hopper. The loading hopper is closed off by a cover which has an opening connected to the outlet end of the conveying pipe. The opening is movable in relation to the loading hopper at least to the extent of the relative movement of the outlet end of the conveying pipe in relation to the loading hopper. The cover is rotatable in relation to the loading hopper and the opening therein which receives the outlet end of the conveying pipe is eccentrically disposed in the cover.

The term "loading hopper" is intended to cover devices which are suitable for conducting the bulk material onward out of the conveying pipe into the filler openings of the transport receptacle and which exhibit a wide, top-sided opening and a narrower outlet opening.

The term "stationary source" is understood to mean that this source is unable to perform any movement of its own which is dependent upon the travel movement of the loading hopper.

The term "conveying pipe" is intended to cover any conveying mechanism which is suitable for conveying the material from the stationary source to the loading hopper and has an essentially non-variable length. This includes pneumatic conveying troughs as well as worm conveyors.

The basis for the invention is the recognition that the outlet end of the conveying pipe which describes a circular arc when the loading hopper is shifted does not necessarily have to describe a linear transverse movement in relation to the loading hopper, but can also perform, in relation to this hopper, a circular arc movement about an axis situated upright in the hopper (crank gear principle). This rotational axis does not necessarily have to be physically present in this case, the rotatable mounting of the guide device can also be provided at a radial distance from it. The opening, disposed in the cover of the hopper, for receiving the outlet end of the conveying pipe is radially distanced from the rotational axis of said hopper. This eccentricity must be at least half as great as the difference between the greatest and smallest distance between the possible positions of the loading hopper along the line of travel from the swivel point of the conveying pipe.

The horizontal dimensioning of the device according to the invention in the direction of travel of the hopper is, depending upon the hopper dimensions, only slightly greater than the maximum travel path. The spatial requirement transversely to the direction of travel is likewise very low, since the cover, due to its rotational movement, is not displaced laterally beyond the hopper rim.

In order to prevent the escape of dust, a seal-tight connection of the cover to the rim of the loading hopper is necessary. This can be more easily realized if the cover and the upper rim of the loading hopper are of circular configuration. In order to achieve a seal between the upper hopper rim and the cover rim, there can be provided, if so desired, a sliding seal which permits the rotational movement of the cover.

It is advantageous if the loading hopper is rotationally symmetrical and tapers conically in the direction of feed of the bulk material. The cover is disposed on the loading hopper such that its rotational axis corresponds to the axis of symmetry. In this way, the inflow and outflow conditions for the bulk material in the loading hopper are independent of its state of travel, since the distance between the discharge opening of the conveying pipe and the discharge opening of the hopper does not vary.

Advantageously, the cover is rotatably mounted on a centrically disposed bearing. This bearing then absorbs the radial forces which are generated upon the travel movement of the hopper. It further has the effect that the contact pressure force of the cover upon the seal of the hopper rim is adjustable and is also constant during the course of a travel cycle. Any escape of dust and premature wearing of the seal is thereby prevented.

It is expedient additionally to provide, in the area of that end of the conveying pipe receiving the bulk material, a dedusting pipe via which the dust-laden air is sucked out of the device.

It is often desirable to suck the dust-laden air also out of the receptacle to be loaded. For this purpose, a dust return conduit is advantageously provided, the hopper-side end of which opens out into an area of the loading hopper which, during the travel cycle, is not traveled over by the conveying pipe, or in other words, the hopper-side end of the dust return conduit is outside the path of the outlet end of the conveying pipe. Such an area exists, since the mouth of the conveying pipe, during the travel movement of the hopper, does not describe a full circle in relation to said hopper, but only describes a circular arc. A spatial separation is thereby achieved, over the entire path of travel of the hopper, between the inflowing bulk material and the dust-laden air flowing back in the hopper. By means of the hopper, which is conically widened in the direction of flow of the dust-laden air, an additional dust separation is achieved, thereby further improving the dedusting performance of the device.

In this context, it is advantageous if the conveying pipe, in the area in which it opens out into the loading hopper, additionally exhibits an inner pipe in which the bulk material is fed, the annular space between the inner pipe and the conveying pipe being provided to allow the dust-laden air to flow away. The dust-laden air can then flow away unimpeded through the inflowing bulk material. It flows through the conveying pipe, in countercurrent to the inflowing bulk material, to the dedusting pipe in the area of the material intake. A pressure which is reduced in relation to the ambient pressure is then obtained throughout the device, so that, even if slight leaks might possibly still be present, any escape of dust is prevented.

The drive for effecting the travel of the hopper can act upon the hopper, upon the conveying pipe or upon other suitable elements of the device.

Where a transverse displacement of that discharge opening which opens out into the transport receptacle is additionally necessary, it is expedient to dispose beneath the loading hopper a second loading hopper into which the first loading hopper opens out and which is displaceable transversely to the direction of travel of the first loading hopper. Since, however, the kinematic connection according to the invention between the loading hopper, its cover and the conveying pipe is insensitive to lateral movement of the loading hopper, even said loading hopper itself, in addition to its movability in a principal direction, can also be transversely displaceable.

An illustrative embodiment of the invention is described below with reference to the drawing, in which.

Figure 2:
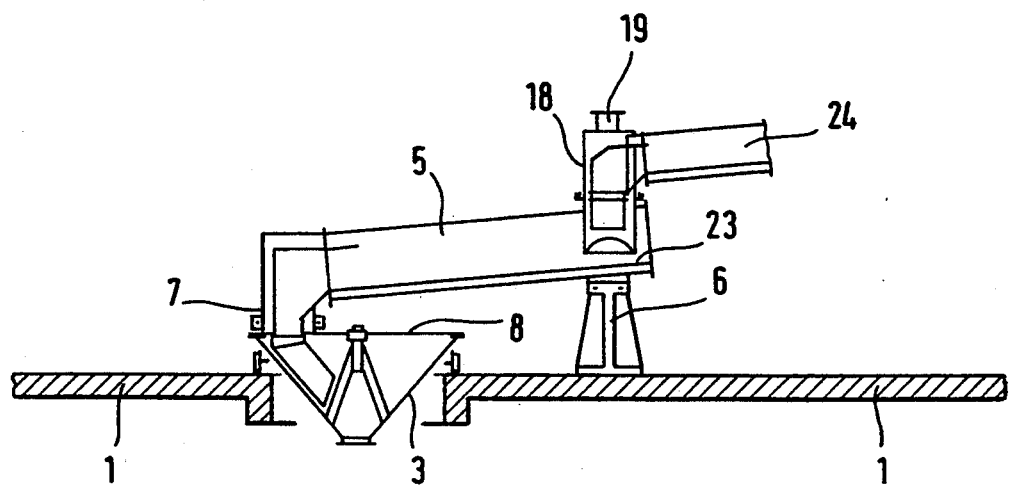
FIG. 2 shows a sectional view of the device in a plane lying perpendicular to the direction of travel of the hopper.
Figure 3:
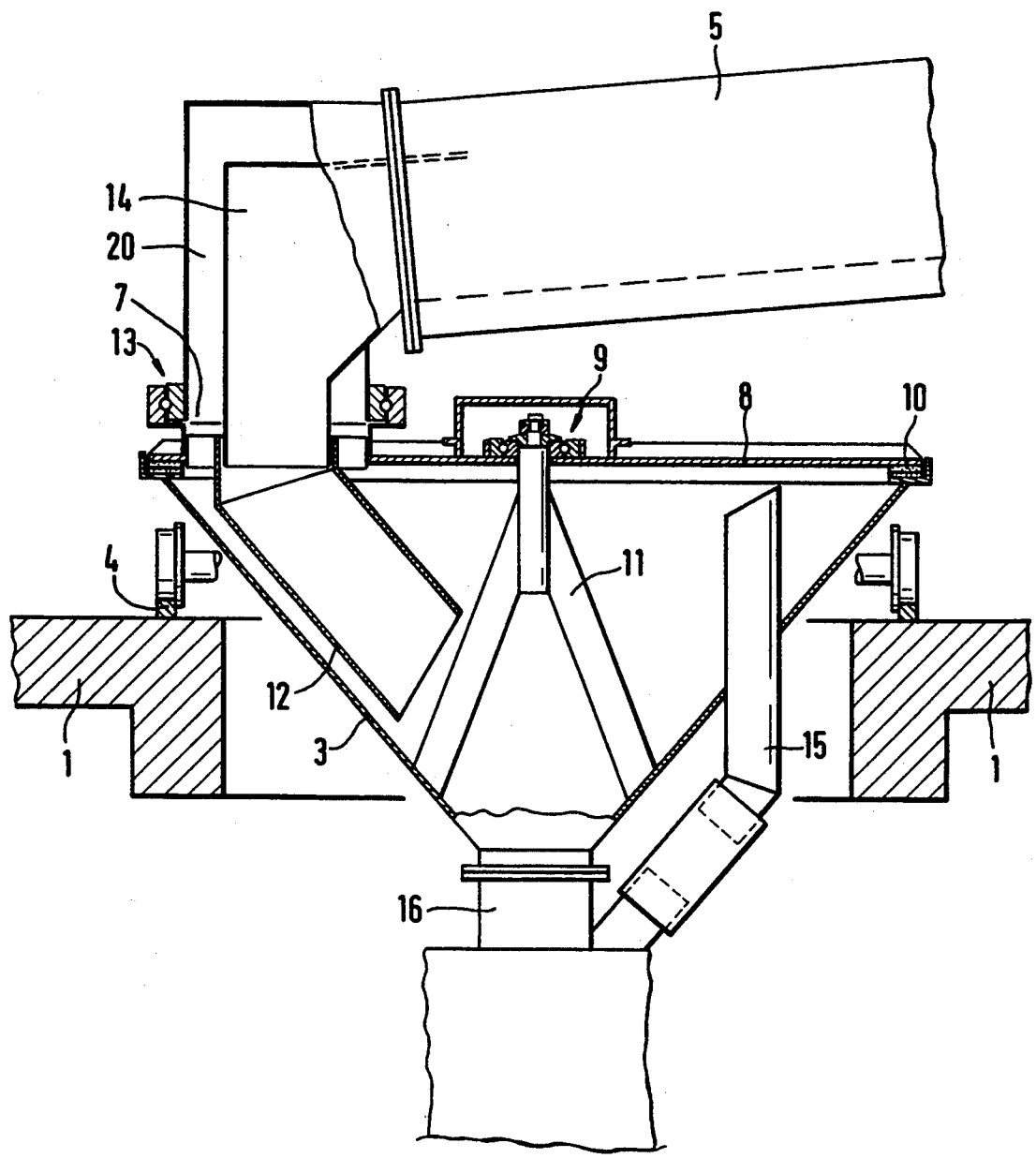
FIG. 3 shows a detail from FIG. 2, in which the loading hopper is shown.

The device is disposed on a horizontal baseplate 1, which can be, for example, a component part of a silo. The plate 1 exhibits a rectangular cutout 2, through which there protrudes the loading hopper 3. The hopper 3 is displaceable, parallel to the long side of the rectangular cutout, on rails 4 (see FIG. 3). The drive for the displacement of the hopper is not represented in the drawing. Beneath the hopper 3 and parallel to its direction of travel there runs the path of travel (not represented) on which the transport receptacles to be filled (likewise not represented) are supplied. The conveying pipe 5 is fastened pivotably on a bearing block 6. With its hopper-side end 7, it forms a seal with the cover 8. The circular cover 8 is rotatably mounted on a bearing 9. Its outer rim forms, by means of a sliding seal 10, a tight seal with the upper rim of the loading hopper 3. The forces acting upon the bearing 9 are transmitted via struts 11 onto the hopper base. From the cover 8, a pipe section 12 which is fastened thereto protrudes obliquely downwards into the loading hopper 3. The cover 8 further exhibits a bearing 13 for the rotatable mounting of the outlet end 7 of the conveying pipe 5. In this end 7 there is disposed an inner pipe 14, which opens out into the pipe connection 12. In the area of the hopper mouth 16 there is disposed a dust return conduit 15, which returns the dust-laden air from the receptacle to be filled into the hopper 3. For reasons of clarity, said conduit is not represented in FIG. 2.

The conveying pipe is represented as a closed pneumatic conveying trough. A worm conveyor, for example, can also be used instead, which worm conveyor has the advantage that no conveying gradient is necessary and structural height savings are therefore made and that a preliminary ventilation already takes place therein. This latter is advantageous, above all, in relation to materials having a high air-holding capacity.

Figure 1:
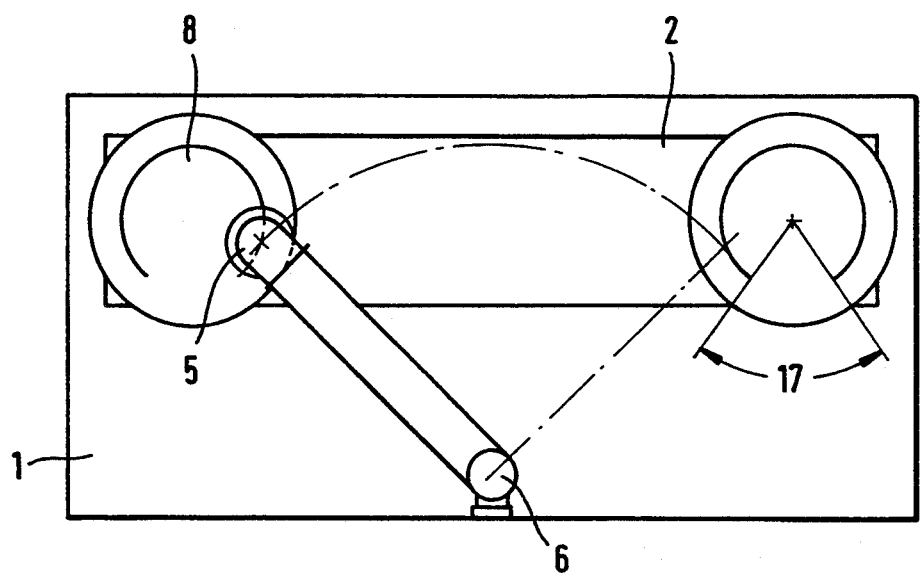
FIG. 1 shows a diagrammatic view of the device from above.

Upon the shifting of the hopper 3, the conveying pipe 5 performs a swivel movement about the axis of its bearing block 6. Its outlet end 7 hereupon describes, in relation to the baseplate 1, a wide circular arc, the center-point of which is the axis of the bearing block 6 and, in relation to the loading hopper 3, a narrower circular arc, the center point of which is the bearing 9 of the cover 8. A certain segment 17 of the hopper 3 (see FIG. 1) is not in this case swept over by the pipe end 7. In this segment there is disposed the hopper-side end of the dust return conduit 15.

When the device is operated, the hopper 3 is initially driven into the desired position. Bulk material is then fed into the material intake 24 inclined in the direction of the hopper 3. The bulk material flows under gravitational force through the combined intake/dedusting pipe (similar to 20/14) 18 into the feed end 23 of the conveying pipe 5, said conveying pipe being likewise inclined in the direction of the hopper 3. It then flows onward through the inner pipe 14 and the pipe connection 12 into the loading hopper 3. From the mouth 16 of said loading hopper, it then flows through a loading assembly, known per se, into the transport receptacle (not represented).

Air is sucked out of the upper opening 19 of the dedusting pipe 18, thereby creating underpressure in the conveying pipe 5 and in the hopper 3. The dust-laden air generated in the transport receptacle during loading is therefore sucked via the dust return conduit 15, one end of which protrudes into the filler pipe of the transport receptacle, into the hopper 3. Here the dust is partly able to settle and to flow with the fed bulk material back into the transport receptacle. The remaining dust-laden air is sucked out of the hopper 3 through the annular space 20 between the hopper-side end 7 of the conveying pipe 5 and the inner pipe 14. It makes its way through the conveying pipe 5, in countercurrent to the fed bulk material, into the combined intake/dedusting pipe (similar to 20/14) 18, whence it can be fed to suitable filtering plants (not represented).

Figure 4:
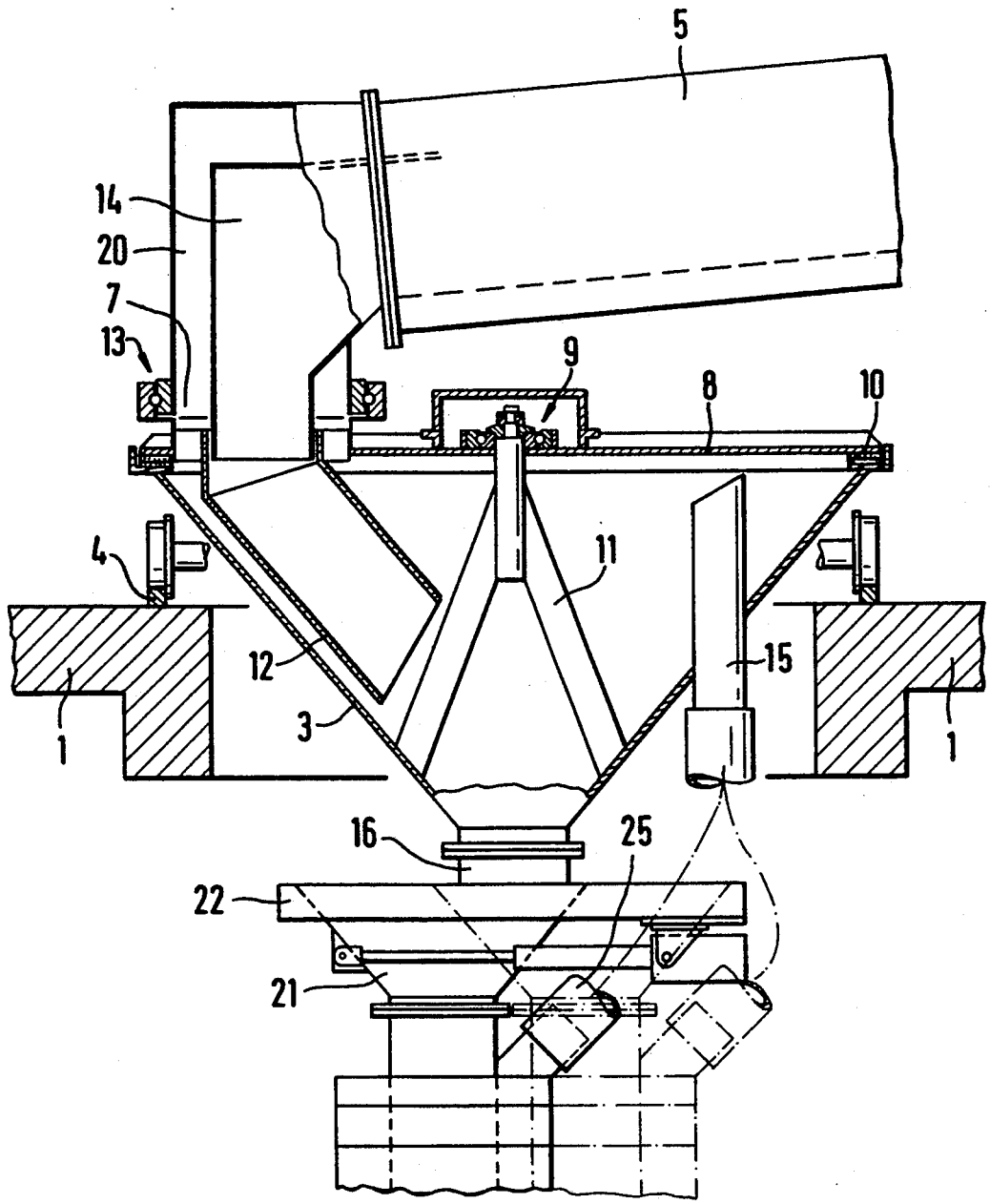
FIG. 4 shows the same detail with an additional second loading hopper which is displaceable transversely to the direction of travel of the first loading hopper.

FIG. 4 shows a somewhat modified embodiment of the device. Beneath the first loading hopper 3 there is disposed a second loading hopper 21, which is displaceable transversely to the direction of travel of the first loading hopper 3. In the two end positions of the hopper 21, the mouth 16 of the first hopper 3 is in each case located at the rim of the filler opening of this second hopper 21. Here, a cover plate 22 prevents the escape of dust. The dust return conduit 15 exhibits a flexible hose part 25 to enable the second hopper 21 to be displaced.

I claim:

1. A device for loading bulk material from a stationary source to a filler pipe located at a chosen spot within a predetermined line of travel, comprising a first loading hopper which is shiftable along the line of travel and includes, at a lower end, a filling mechanism, and a conveying pipe for feeding the bulk material to the first loading hopper, the conveying pipe having a receiving end for receiving bulk material from the stationary source and an outlet end, the conveying pipe being pivotally mounted at the receiving end for rotation about a first axis, said line of travel being remote from and nonintersecting with said first axis, the first loading hopper being closed off at the top by a cover having an opening connected to the outlet end of the conveying pipe, the cover being rotatable relative to the first loading hopper about a hopper axis positioned within said line of travel, said cover opening and outlet end being offset from said hopper axis whereby the receiving end of the conveying pipe rotates about said first axis and the outlet end of the conveying pipe rotates around the hopper axis as the first loading hopper moves along said line of travel.

2. The device as claimed in claim 1, wherein the first loading hopper has an upper rim, the cover has a cover rim, the cover rim and the upper rim of the first loading hopper are of circular configuration, and the cover rim forms a tight seal with the upper rim of the first loading hopper.

3. The device as claimed in claim 1, wherein the first loading hopper is rotationally symmetrical and tapers conically in the direction of feed of the bulk material.

4. The device as claimed in claim 1, wherein the cover is rotatably mounted on a centrically disposed bearing.

5. The device as claimed in claim 1, wherein a dedusting pipe is provided at the receiving end of the conveying pipe.

6. The device as claimed in claim 5, wherein the conveying pipe, additionally includes, at its outlet end, an inner pipe into which the bulk material is fed thereby defining an annular space between the conveying pipe and inner pipe, the annular space between the inner pipe and the outlet end of the conveying pipe being provided to allow the dust-laden air to flow away.

7. The device as claimed in claim 1 wherein the outlet end of the conveying pipe is movable along a path, a dust return conduit having a hopper-side end and an opposite end is provided for returning dust-laden air out of a receptacle in order to load the dust-laden air into the first loading hopper, the hopper-side end of the dust return conduit opening out into an area of the hopper which is outside the path of the outlet end of the conveying pipe.

8. The device as claimed in claim 1, wherein a second loading hopper is disposed beneath the first loading hopper, the first loading hopper opening into the second hopper, the second loading hopper being displaceable transversely to the direction of travel of the first loading hopper.

9. A device for loading bulk material, comprising:
a conveying pipe having a receiving end for receiving the bulk material from a stationary source and an outlet end which is movable along an arcuate path relative to the receiving end, said pipe being rotatable at the receiving end about a first axis,
a loading hopper for receiving the bulk material from the outlet end of the conveying pipe, the loading hopper being movable along a predetermined line of travel remote from said first axis, and
a rotatable cover on the loading hopper rotatable about a second axis within said line of travel and having an opening which is connected to the outlet end of the conveying pipe, said opening and connected outlet end being offset from said second axis whereby movement of the loading hopper along the line of travel is associated with rotational movement of the pipe about the first axis and simultaneous rotational movement of the cover and outlet end of the pipe about the second axis.

* * * * *